United States Patent [19]
El-Ghatta et al.

[11] 3,844,971
[45] Oct. 29, 1974

[54] PROCESS FOR THE MANUFACTURE OF CONDENSATION PRODUCTS SUITABLE AS HARDENERS FOR EPOXIDE RESINS

[75] Inventors: Hussain El-Ghatta; Heinz Lussi; Clau Berther; Manfred Hoppe, all of Chur/Gr, Switzerland

[73] Assignee: Inventa A.G. fur Forschung und Patentverwertung, Zurich, Switzerland

[22] Filed: May 15, 1972

[21] Appl. No.: 253,285

[30] Foreign Application Priority Data
May 14, 1971 Switzerland.................... 7182/71

[52] U.S. Cl............... 252/182, 260/2 N, 260/33.4, 260/47 EN
[51] Int. Cl............................................ C08g 51/84
[58] Field of Search........ 252/182; 260/47 EN, 2 N, 260/33.4

[56] References Cited
UNITED STATES PATENTS

| | | | |
|---|---|---|---|
| 3,265,669 | 8/1966 | Hirosawa | 252/182 |
| 3,642,649 | 2/1972 | Green et al. | 252/182 |
| 3,709,847 | 1/1973 | Toepfl et al. | 260/47 EN |
| 3,718,618 | 2/1973 | Wagner et al. | 260/47 EN |
| 3,740,373 | 6/1973 | Bentley et al. | 252/182 |

*Primary Examiner*—Benjamin R. Padgett
*Assistant Examiner*—Irwin Gluck
*Attorney, Agent, or Firm*—Bierman & Bierman

[57] ABSTRACT

Byproducts of the oxidation of cycloalkanes, which react with primary and secondary amines, are condensed with polyvalent aliphatic amines. The condensation products are inexpensive and are suitable as epoxide resin hardners. The condensation products generally contain in chemically bound form about 50 percent or more of said byproducts. Resins hardened with the hardeners of the present invention surprisingly show increased impact strength.

8 Claims, No Drawings

PROCESS FOR THE MANUFACTURE OF CONDENSATION PRODUCTS SUITABLE AS HARDENERS FOR EPOXIDE RESINS

The present invention relates to new condensation products, a process for their manufacture, and their use as hardeners for epoxide resins.

Processes for hardening epoxide resins have been described in the prior art. These known processes utilize condensation products of mono- and/or dicarboxylic acids as hardeners. Such processes are inter alia described in German Federal Patents Nos. 972,757 and 1,105,611; in French Patent No. 1,157,453, in British Patent No. 789,108; and in German Auslegeschriften Nos. 1,074,856; 1,079,320 and 1,089,544.

Prior art condensation products possess aminoamide, imidazolin or aminoimidazolin structures. When used as hardeners, they supposedly afford a number of advantages as compared with the use of unmodified polyamines. Because of their lower volatility, they are less unpleasant and less harmful to health when worked up. They are also less poisonous. When they are used in the hardening reaction, less spontaneous heating takes place. Further, the hardened epoxide resins are supposedly less brittle.

In spite of their supposed advantages, only the aminoamides obtained from dimerised fatty acids, which are known commercially as "Versamid" (trademark of General Mills, Inc.), "Reammide" and "Casamide" (trademarks of Chemplast, Milano, Italy and Polyamidasargentinas Saic, Buenes Aires, Argentine), have attained practical importance. All other condensates, particularly those made from customary linear, aliphatic, mono- and dicarboxylic acids with polyimines, are hardly used. One of the underlying reasons for this is that these condensation products are more expensive and they do not offer sufficient advantages to justify their cost. Their higher price arises from the fact that in addition to their cost of preparation, considerable material costs are incurred in procuring the necessary mono- or dicarboxylic acids. It is well known that byproducts form when cycloalkanes are commercially oxidized with air to cycloalkanols and cycloalkanones. These byproducts comprise a complex mixture of monocarboxylic acids, dicarboxylic acids, hydroxycarboxylic acids and other partly unidentified products. Byproducts of a different composition also form when the cycloalkanols and cycloalkanones are further oxidized with nitric acid to the corresponding dicarboxylic acids. The technically most important process of this type consists of the oxidation of cyclohexane with air to cyclohexanol and cyclohexanone, and the further oxidation of the cyclohexanol and cyclohexanone with nitric acid, to produce adipic acid. The analogous oxidation of cyclodecane has also recently acquired industrial importance.

The quantities of these byproducts are very considerable. In the oxidation of cyclohexane with air to cyclohexanol and cyclohexanone, e.g., 10–20 percent of the oxidized cyclohexane is converted to byproducts. An approximate analysis of such a byproduct is as follows:

| | |
|---|---|
| Butyric acid | 3 – 5% by weight |
| Valeric acid | 17 – 21% by weight |
| Caproic acid | 5 – 7% by weight |
| Succinic acid | 3 – 5% by weight |
| Glutaric acid | 6 – 8% by weight |
| Adipic acid | 15 – 18% by weight |
| Hydroxycaproic acid | 24 – 30% by weight |
| Unidentified products | 14 – 18% by weight |

Separation of such mixtures into their individual components is generally uneconomical. No use has heretofore been found for such byproducts. Furthermore, they are difficult to dispose of. They must be burnt as waste in an uneconomical way. This leads to additional environmental pollution.

It has now surprisingly been found that condensation products can be made at a cost no greater than that of the waste products. Further, these condensation products are outstandingly suitable as hardeners for epoxide resins. These advantages are attainable when byproducts which are formed in the oxidation of cycloalkanes and which react with primary and secondary amines, are condensed with polyvalent aliphatic amines.

The success of this process is surprising, since the said byproducts not only consist of complicated mixtures of partly unidentified components, but also are produced in processes which are to a large extent the best available and unrelated to the present intended use, namely, processes for producing cycloalkanols, cycloalkanones and dicarboxylic acids.

This can be shown in a very striking way. Butyric acid, adipic acid, and the byproduct described below as "Reject acid Mixture B" were condensed in the same way, each with 2 mols of the aliphatic amine triethylenetetramine per mol of carboxyl groups, and unreacted amine was then distilled off. The three condensation products so obtained, and as a further comparative substance triethyltetramine itself, were mixed with an epoxide casting resin based on 2,2-bis-(p-hydroxyphenyl)-propane ("Bisphenol-A") and epichlorhydrin, and having an epoxide equivalent weight of 195, in proportions such that as far as possible exactly one epoxide group was present per amine hydrogen atom. In the case of the reject acid mixture B, this proportion cannot be calculated exactly, so that with this product a series of mixtures (see the following table 1) were used.

After hardening the product for 12 hours at 20°C and finally for 4 hours at 120°C, the impact resistances were determined according to DIN 53453. The results are shown in Table 1 below.

Table 1

| Condensation product (Hardener) | g Condensation product per 100g of epoxide resin (Bisphenol A) | Impact Strength |
|---|---|---|
| TETA | 13.4 | 8.7 cm kp/cm² |
| Condensate of butyric acid + TETA | 29.6 | 15 cm kp/cm² |
| Condensate of adipic acid + TETA | 26.4 | 8 cm kp/cm² |
| Condensate of reject acid B + TETA | 36.5 | 23 |
| | 40 | 24 |
| | 45 | 39 |
| | 55 | 21 |

TETA = Triethylenetetramine

In all cases, the impact strength of the condensate of the reject acid exceeded the impact strengths of the condensates produced from the individual components. This synergism is unexpected.

One of the advantages of the condensation products according to the present invention lies in their low vapor pressures. Because of this, these products are less harmful to health, less dangerous and more convenient to work up than the polyvalent aliphatic amines used in their production. Moreover, they are much less sensitive to atmospheric damp and carbon dioxide as compared to aliphatic polyamines. Some products which may be made according to the present invention have room temperature viscosities of only a few poises, and are very easily worked up with fluid epoxide resins.

Hardeners having similar good properties are already known in the art. However, they cannot be produced as economically as those described in the present invention.

The condensation products produced in accordance with the present invention may be considered as greatly improved polyamine hardeners which generally contain in chemically bound form about 50 percent or more of the hitherto worthless byproducts of cycloalkane oxidation. Because their manufacture can be carried out with little expense, the products obtained in accordance with the present invention are even cheaper than the already favorably priced starting amines.

The condensates of the present invention are particularly well suited to all uses wherein cost is of primary interest. Road coatings and floor coverings amongst others are examples of such applications.

Generally, all polyvalent aliphatic amines may be used in the production of the condensation products of the invention. An example of such a polyamine is the compound

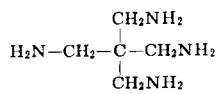

Best results are however obtained with the use of amines of Formula I

(I)

wherein A is a lower divalent alkylene radical, having at least two carbon atoms, which (A) is linked to the adjacent members by means of two different carbon atoms, and $n$ is 2-6, preferably 2-4. The radicals A, which occur n-times, may be the same or different. Therefore "polyalkylenepolyamines" are included.

Preferred amongst such amines are diethylenetriamine, triethylenetetramine and bis-(3-aminopropyl)-imine.

Examples of byproducts of the oxidation of cycloalkanes, which may be used for the production of the condensation products according to the present invention include, primarily, the byproducts which form in very large quantity in the oxidation of cyclohexane, methylcyclohexane or cyclodecane with atmospheric oxygen. These are advantageously separated from the main product of the oxidation by extraction with aqueous alkali solutions. This is followed by acidification and extraction of the aqueous solutions. For the most part the byproducts comprise acid-reacting products, particularly mono- and dicarboxylic acids. It should be noted that the composition of the isolated by-product, and therefore the properties of the condensate produced, depend not only on the kind of cycloalkane oxidized, the oxidizing agent, and the reaction conditions employed in the oxidation, but also on the solvent used in the extraction of the byproduct from the acidified alkali solution.

Thus, e.g., in the oxidation of cyclohexane with air, byproducts in accordance with the preceding table are obtained if, after acidification, the aqueous alkaline extract is extracted with methyl ethyl ketone. If, however, cyclohexane is used in this extraction in place of the methylethylketone, the resultant product will contain more monocarboxylic acids and less dicarboxylic acids.

Other byproducts which can be converted with the said amines to condensates utilizable in accordance with the invention are obtained in the oxidation with nitric acid, of cycloalkanones and cycloalkanols (which are, in turn, obtained by oxidizing cycloalkanes). After the thus produced dicarboxylic acids are crystallized out, the byproducts remain in solution in the mother liquor and can be recovered therefrom by evaporation, further crystallization or extraction. The byproducts so obtained contain inter alia particularly large quantities of dicarboxylic acids.

As is apparent from the foregoing, the byproducts used in the present invention fall within a broad range of compositions. It is therefore possible on this basis and by selection of a suitable amine to produce a large number of condensates having very different properties, so that for any use a particularly suitable condensate may be found. If desired, byproducts of differing origin can be blended with one another to obtain particular combinations of properties. Alternatively, different condensates may be mixed with one another.

Particularly suitable hardeners are obtained if preferred amines are treated with preferred byproducts.

Fundamentally, it is also possible with the aid of known methods such as distillation, crystallization or extraction, to shift the composition of the byproducts in a desired direction. Also modification of the condensation products obtained can be produced by adding to the byproducts used according to the invention additives such as fatty acids. For the production of the condensates according to the invention, the starting materials are used in such proportion that per equivalent of titratable acid groups in the waste product at least two amino groups of the polyamine are present. Preferably 2-8 mols of polyamine per acid equivalent are used, since lower viscosity condensates with better workability are thereby obtained.

The use of a greater quantity of polyamine affords little change in the properties of the condensates and decreases the economy of the process. In carrying out the condensation, the starting components are advantageously heated together under a protective gas, preferably nitrogen, for 1 to 6 hours at a temperature of about 150°C to 330°C. Water which forms in the reaction is distilled off.

It is believed that in these condensations carboxyl and amino groups present react to form amides, and particularly when high condensation temperatures are used, imidazolin structures are formed. Since, however, the mixtures undergoing reaction contain a large number of other functional groups, such as hydroxyl and carbonyl groups, it is assumed that during condensation still further reactions take place. The nature of these further reactions can only be conjectured at present.

The condensation products obtained in the way described can be directly used as hardeners for epoxide resins. Frequently, it is preferred to distill off unreacted amine from the condensation product, if desired under vacuum. This is particularly the case if a relatively large quantity of free amine is still present after the reaction. The condensate to be used according to the invention forms the distillation residue. The distilled amine can obviously be used in the next batch, or the process may be operated continuously.

Epoxide resins which can be hardened with the condensates to be used according to the invention are compounds with more than one epoxide group per molecule. Their production is advantageously effected by action of epihalogen hydrins or dihalogen hydrins on polyvalent alcohols or monocyclic or polycyclic phenols, particularly of the 2,2-bis-(p-hydroxyphenyl)-propane type ("Bisphenol A"), in the presence of alkali. Furthermore, such compounds may be obtained by direct epoxidation of suitable compounds having more than one double bond per molecule.

The composition and structure of the condensation products according to the invention are not exactly known. Therefore, if one wishes to produce hardenable masses having desired properties, the quantitative proportions of epoxide resin and condensation product as defined must be empirically determined. The production of the said hardenable masses is effected in a known manner by simple admixture of the epoxide resin with one of the condensation products according to the invention, at room temperature, possibly at slightly raised temperature. These mixtures may contain still further components like fillers, pigments, dyestuffs, accelerators, softeners or reactive diluents, etc.

So-called "in situ" adducts of the condensate according to the invention are particularly well suited for the production of solvent containing two-component coatings. Such adducts, as is known, are produced by reacting the hardener with epoxide compounds in a quantity insufficient for the formation of cross-linked products, preferably in the presence of solvents. Shortly before use, these in situ adducts are mixed with the quantity of epoxide resin required for hardening, usually in the form of a solution. The hardening of the epoxide resin condensation product mixture takes place even at room temperature and with the evolution of heat. It can be accelerated by heating. In some of the systems a subsequent tempering of the prepared products at 70°C to 150°C has been found to be advantageous for the full development of the desired properties. In other cases, particularly if subsequent tempering is not possible, the addition of one of the known accelerators has proven useful.

The invention is illustrated in the following examples.

The epoxide resin employed in the examples is based on 2,2-bis-(p-hydroxyphenyl)-propane and epichlorhydrin.
Production of the Starting Acids (which with the amines as defined are converted to the hardeners used in accordance with the invention)

I. Cyclohexane is oxidized with air at 160°C and under 10 atmospheres pressure in the presence of 1 ppm of Co as Co-napthenate, until a conversion of 6.5 percent (calculated on cyclohexane) is achieved. The reaction product is washed with a 10 percent aqueous caustic soda solution, and the aqueous phase is acidified with sulphuric acid. Of the acidified mixture, one half a. is extracted with cyclohexane. After removal of the cyclohexane, an "Acid mixture A" is obtained. It has an acid number of 422 (mg KOH/g acid mixture) and an acid equivalent weight of 133 g.

b. The other half is extracted with methyl ethyl ketone. After removal of the methyl ethyl ketone an "Acid mixture B" is obtained. It has an acid number of 435 (mg KOH/g acid mixture) and an acid equivalent weight of 129g. If Acid mixture B is distilled at 90°C and and 3 mm Hg, Acid mixture A is obtained.

II. Cyclohexane is oxidized with air at 185°C under a pressure of 15 atmospheres and in the absence of catalysts, until a conversion of 4 percent (calculated on cyclohexane) is achieved. The reaction product is washed with 10 percent aqueous caustic soda solution and the aqueous phase is acidified with sulphuric acid. Of the acidified solution:

a. One half is extracted with methyl ethyl ketone. After removal of the solvent, an "Acid mixture C" is obtained. It has an acid number of 362 (mg KOH/g acid mixture) and an acid equivalent weight of 155 g.

b. The other half is extracted first with cyclohexane and then with methyl ethyl ketone. The solvent is removed from the methyl ethyl ketone extract. An "Acid mixture D" is obtained. It has an acid number of 300 (mg KOTT/g acid mixture) and an acid equivalent weight of 187 g.

III. Cyclodecane is oxidized with air, under slightly elevated pressure, at 180°C, and in the presence of a boron compound such as boric acid. After a preliminary washing with water to separate the boric acid, the acid part of the reaction mixture is washed with aqueous alkali solution. Neutral portions (e.g. esters) are emulsified in the alkaline wash water. The wash water is boiled for 2 hours to saponify the esters present. The alkaline wash water is then diluted with water and cooled to room temperature. The main quantity of the neutral part precipitates and can be filtered off. In order to recover the residual neutral portion, the filtrate is extracted several times with methyl ethyl ketone. The aqueous alkaline phase is then acidified with sulphuric acid and the liberated carboxylic acids are extracted with methyl ethyl ketone. The solvent is removed from the extract. An "Acid mixture E" is obtained. It has an acid number of 255 (mg KOH/g acid mixture) and an acid equivalent weight of 220g.

EXAMPLE I

A. Production of the Condensation Product (Hardener)

1168g of triethylenetetramine (8 mols) is placed in a 3 liter, 3 necked flask. The flask is provided with a thermometer, a distillation bridge and a nitrogen inlet tube. 266g of Acid mixture A (two equivalents) are needed. During the addition of the acid mixture, the internal temperature rises to 100°C. The reaction mixture is then heated within 4 hours, under nitrogen, to 200°C. The water of condensation begins to distill over at a product temperature of 160°-170°C. 59g of condensation water and neutral portion pass over. 925g of excess amine are finally distilled over at 0.2 mm Hg vacuum and at a 150°C flask contents temperature.

450g of an oily light yellow product remains as a residue. It has an amine number of 634 mg/KOH/1g product, and a viscosity at 25°C of 520 CP.

B. Hardening of the Epoxide Resin

The following mixtures are made of liquid epoxide resin (Epoxide value: 0.52 equivalents/100 g resin, Viscosity at 25°C, 11000 CP) and the hardener described in the preceding section A, in the proportions by weight stated in the following Table 2. The mixtures are hardened for 12 hours at 20°C and 4 hours at 120°C. The impact strengths and hot rigidities according to Martens, of the hardened test body (120 mm × 10 mm × 15 mm) are set forth in Table 2 which follows.

Table 2

| g Hardener 100 g Epoxide resin | Impact strength (DIN 53,453) (Kp cm/cm$^2$) | Martens temperature (DIN 53,458) °C |
|---|---|---|
| 30 | 13 | 76 |
| 33.8 | 27 | 71 |
| 40 | 17 | 68 |
| 45 | 23 | 63 |

The condensation product (hardener) produced according to this example is useful as a component of 2-component epoxide resin lacquers. The following mixtures are prepared:

a. For the manufacture of an in-situ adduct solution, 45.0 parts by weight of the hardener produced according to this example, 24.0 parts by weight of Xylene, and 6 parts by weight of n-butanol are treated, while stirring, with 25 parts by weight of a solid epoxide resin (epoxide value 0.195 - 0.22, softening point 64°-74°C, epoxide equivalent 500). The reaction mixture is then stirred for 1 hour at 80°C. A 70 percent in-situ adduct solution having an H-equivalent of 165 and a viscosity at 25°C of 956 cp is obtained. 16.5 parts by weight of the above adduct solution are added for hardening, to 100 parts by weight of an epoxide resin lacquer containing solvent which contains 50 parts by weight of the epoxide resin described above (epoxide equivalent 500 etc.).

The solvent consists of 25 parts by weight of a commercial xylene mixture, 10 parts by weight of methyl isobutyl ketone, 5 parts by weight of ethylene glycol monomethyl ether, 5 parts by weight of methyl isobutyl carbinol and 5 parts by weight of a 55 percent melamine resin solution in n-butanol. After application and hardening, coatings with glossy and fault-free film surfaces are obtained.

b. 100 parts by weight of a liquid epoxide resin (epoxide value 0.52 equivalents per 100 g of resin; viscosity at 25°C, 11000 cp) are mixed with 34 parts by weight of the previously described hardener and 20 parts by weight of benzyl alcohol. The solvent-free lacquer obtained, when hardened, yields fault-free film surfaces which are free from stickiness.

Properties of the Films Obtained

1. Progress of Hardening

The increase of surface hardness was determined according to DIN 53,157. Pendulum hardness was determined at 20°C according to Koenig. The test bodies are coated glass plates.

Table 3

| Epoxide resin hardener system | Hardening time in days | | | | | |
|---|---|---|---|---|---|---|
| | 1 | 2 | 3 | 7 | 14 | 21 |
| (a) Solvent-containing system with adduct hardener (1) | 61 | 120 | 120 | 137 | 172 | 172 |
| Solvent-free system (2) | | | | 81 | 120 | 120 |

(1) Dry film thickness 100 μ m

2. Erichsen Methods

The elasticity, extension and adhesiveness of the films were investigated by the Erichsen methods (DIN 53,156). The test bodies were coated iron sheets 110 × 70 × 1 mm.

Table 4

| Epoxide resin and hardener system | Hardening time in days | | |
|---|---|---|---|
| | 7 | 14 | 21 |
| Solvent-containing system with adduct hardener (1) | 10.2 | 10.1 | 10.1 |
| Solvent-free system (2) | 7.6 | 7.5 | |

(1) Dry film thickness 80 – 90 μ m
(2) Dry film thickness 300 μ m

3. Ketone Test

In order to investigate the stability of the films towards organic solvents, the "ketone test" was performed. The hardened film was immersed for 20 minutes in methyl isobutyl ketone. The softening was tested by pendulum hardness testing.

Table 5

| Epoxide resin hardener system | Pendulum hardness according to Koenig (DIN 53,157) | |
|---|---|---|
| | Before ketone test (3) | After ketone test (2) |
| (a) Solvent-containing system with adduct hardener (1) | 172 | 171 |
| (b) Solvent-free system (2) | 148 | 147 |

(1) Dry film thickness 100 μ m
(2) Dry film thickness 300 μ m
(3) After 21 days hardening

EXAMPLE 2

399 g of Acid mixture A (three equivalents) and 618 g of diethylenetetramine (6 mols) are condensed together in the same way as described in Example 1. 109.5 g of condensation water, neutral component and amine pass over. The residual excess amine is then distilled off at 0.2 mm Hg vacuum and up to 140°C flask contents temperature. The quantity of amine distilled off amounts to 405.5 g. 502 g of an oily light brown product remains as a residue. It has an amine number of 359 m KOH/g product and a viscosity at 25°C of 1,060 cP.

The following mixtures are made from a liquid bisphenol A epoxide resin (epoxide value 0.52 equivalents/100 g resin, viscosity at 25°C 11,000 cP) and the product described in this Example 2. The mixtures are hardened for 2 hours at 20°C and 4 hours at 120°C. The impact strength and hot rigidity according to Martens, of the hardened test bodies (120mm × 10mm × 5mm) are set forth in Table 6 below.

Table 6

| g. condensation product per 100 g Epoxide Resin | Impact strength (DIN 53,453) Kp. cm/cm² | Martens temperature (DIN 53,458) (°C) |
| --- | --- | --- |
| 37.7 | 16 | 72 |
| 45 | 19 | 60 |

EXAMPLE 3

532.0 g of Acid mixture A (4 equivalents) and 2336.0 g of triethylene tetramine (16 molds) are condensed together at 250°–270°C. The condensation and subsequent distillation of the excess amine are carried out in the same way as described in Example 1. 224 g of condensation water, neutral material and amine distill over during the condensation. The total quantity of amine recovered amounts to 1580 g. 663.5 g of an oily light yellow product remains as residue. It has an amine number of 634 mg KOH/1 g product and a viscosity at 25°C of 173 cP.

The following mixtures were made of a liquid bisphenol A epoxide resin (epoxide value 0.52 equivalents/100 g resin, viscosity at 25°C, 11,000 cP) and the product described in this Example 3. The mixtures were hardened for 12 hours at 20°C and 4 hours at 120°C. The impact strength and hot rigidity of the hardened test bodies (120mm × 10mm × 15mm) according to Martens are set forth in Table 7 below.

Table 7

| g condensation product per 100 g epoxide resin | Impact strength (DIN 53,453) (Kp. cm/cm² | Martens temperature (DIN 53,458) (°C) |
| --- | --- | --- |
| 37 | 20 | 76 |
| 40 | 21 | 74 |

EXAMPLE 4

322 g of Acid mixture B (2.5 equivalents) and 730 g of triethylene tetramine (5 mols) are condensed together. The condensation and subsequent distillation of the excess amine is carried out in exactly the same way as described in Example 1. 85 g of condensation water and neutral material distill over during the condensation. The quantity of amine distilled amounts to 417 g. 550 g of a brown, highly viscous product remains as residue. It has an amine number of 331 mg KOH/g product and a viscosity at 25°C of 260 P.

The following mixtures were made of a liquid bisphenol A epoxide resin (epoxide value 0.52 equivalents/100 g resin, viscosity at 25°C, 11,000 cP) and the product described in this Example 4. The mixtures were hardened for 12 hours at 20°C and 4 hours at 120°C. The impact strength and hot rigidity according to Martens, of the hardened test bodies (120mm × 10mm × 15mm) are shown in Table 8 below.

Table 8

| g condensation product per 100 g epoxide resin | Impact strength (DIN 53,453) (Kp. cm/cm²) | Martens temperature (DIN 53,458) (°C) |
| --- | --- | --- |
| 36.5 | 23 | 87 |
| 40 | 24 | 71 |
| 45 | 39 | 75 |
| 55 | 21 | 62 |

EXAMPLE 5

620 g of Acid mixture C (4 equivalents) and 1168.0 g of triethylenetetramine (8 mols) are condensed together. The condensation and subsequent distillation of the excess amine are carried out in exactly the same way as described in Example 1. 185.0 g of condensation water and neutral material pass over in the condensation. The quantity of amine distilled over amounts to 719.0 g. 884.0 g of a brown viscous product remains as residue. It has an amine number of 393 mg KOH/g product and a viscosity at 25°C of 72 P.

The following mixtures were made from a liquid bisphenol A epoxide resin (epoxide value 0.52 equivalents/100 g resin, viscosity at 25°C 11,000 cP) and the product described in this Example 5. The mixtures were hardened for 12 hours at 20°C and 4 hours at 120°C. The impact strength and hot rigidity according to Martens, of the hardened test bodies (120mm × 10mm × 15mm) are shown in Table 9 below.

Table 9

| g condensation product per 100 g epoxide resin | Impact strength (DIN 53,453) (Kp. cm/cm²) | Martens temperature (DIN 53,458) (°C) |
| --- | --- | --- |
| 35 | 17 | 87 |
| 40 | 17 | 82 |
| 45 | 21 | 80 |
| 50 | 17 | 73 |

EXAMPLE 6

880 g of Acid mixture D (4.7 equivalents) and 1375 g of triethylenetetramine (9.4 mols) are condensed together. The condensation and the subsequent distillation of the excess amine are carried out in exactly the same way as described in Example 1. 310 g of condensation water and neutral material pass over during the condensation. The quantity of amine distilled off amounts to 755 g. 1090.0 g of a brown viscous product remains as residue. It has an amine number of 393 mg KOH/g product and a viscosity at 25°C of 625 P.

The following mixtures are made from a liquid bisphenol A epoxide resin (epoxide value 0.52 equivalents/100g resin, viscosity at 25°C 11,000 cP) and the product described in this Example 6. The, mixtures were hardened for 12 hours at 20°C and 4 hours at 120°C. The impact strength and hot rigidity according to Martens, of the hardened test bodies (120mm × 10mm × 15mm) are shown in Table 10 below.

Table 10

| g condensation product per 100 g epoxide resin | Impact strength (DIN 53,453) (Kp. cm/cm²) | Martens temperature (DIN 53,458) (°C) |
| --- | --- | --- |
| 35 | 19 | 95 |

Table 10-Continued

| g condensation product per 100 g epoxide resin | Impact strength (DIN 53,453) (Kp cm/cm²) | Martens temperature (DIN 53,458) (°C) |
|---|---|---|
| 41.1 | 19 | 89 |
| 45 | 17 | 86 |

EXAMPLE 7

484.0 g of Acid mixture E (2.2 equivalent) and 2570 g of triethylenetetramine (17.6 mols) are condensed together at 250°C – 270°C. The condensation and subsequent distillation of the excess amine are carried out in the same way as described in Example 1. 110 g of condensation water, neutral materia and amine pass over during the condensation. The quantity of amine distilled off is 2,374 g. 570 g of a brown viscous product remains as a residue. It has an amine number of 387 mg KOH/g product and a viscosity at 25°C of 110 P.

This condensation product is employed as a component of a 2-component epoxide resin lacquer. The following mixtures are prepared:

a. 100 parts by weight of a liquid bisphenol A epoxide resin (Epoxide value, 0.52 equivalents/100 g resin) are mixed with 60 parts by weight of this condensation product. The solvent-free lacquer obtained has a container life of 4 hours and 30 minutes, and yields, after hardening, films which are free from stickiness and which have fault-free surfaces.

b. 100 parts by weight of an epoxide resin solution which contains 50 percent by weight of epoxide resin (epoxide value, 0.22 equivalents/100 g resin) are mixed with 12 parts by weight of this condensation product. The solvent-containing lacquer has a container life greater than 2 days, and yields, after hardening, films having fault-free surfaces which are free from stickiness.

c. For the manufacture of an in-situ adduct solution, 45.4 parts by weight of the product made according to this Example, 32.0 parts by weight of xylene and 8 parts by weight of n-butanol are treated, while stirring, with 14.6 parts by weight of a solid epoxide resin having an epoxide equivalent of 500. The reaction mixture is then stirred for 1 hour at 80°C. A 60 percent in-situ adduct, having an H equivalent weight of 280 and a viscosity at 25°C of 2,950 cP is obtained. 28 parts of the foregoing adduct solution are added for hardening to 100 parts by weight of a solvent-containing epoxide lacquer which contains 50 percent by weight of epoxide resin (Epoxide equivalent = 500). The adduct solution obtained has a container life of 2 days, and yields, after hardening, glossy fault-free film surfaces which are free from stickiness. The fibers obtained had the following properties:

1. Progress of Hardening

The increase of surface hardness was determined according to DIN 53,157.

Pendulum hardness was determined at 20°C according to Koenig.

TABLE 11

| | Epoxide resin hardener system | Time in days | | | | |
|---|---|---|---|---|---|---|
| | | 1 | 2 | 7 | 18 | 30 |
| (a) | Solvent-free system | 32 | 152 | 186 | 230 | 266 |
| (b) | Solvent-containing system | 32 | 90 | 147 | 180 | 212 |
| (c) | Solvent-containing system with adduct hardener | 58 | 116 | 172 | 198 | 210 |

The test bodies were coated glass plates. The dry film thicknesses were
System (a) solvent-free 250 – 300 μ m
System (b) solvent-containing 35–40 μ m
System (c) adduct lacquer 50–60 μ m 2. Erichsen Test The elasticity, extension and the adhesiveness of the films were tested by Erichsen's methods (DIN 53,156).

TABLE 12

| Epoxide-Hardener System | Hardening time in days at 20°C and artificial ageing. | | |
|---|---|---|---|
| | 7 days 20°C. | 7 days 20°C +11 days 60°C | 7 days 20°C +11 days 100°C |
| (a) Solvent-free system (1) | 1.4 | 0.9 | 1.4 |
| (b) Solvent-containing system (2) | 9.8 | 8.5 | 8.9 |
| (c) Solvent-containing system with adduct hardener (3) | 10.4 | 9.4 | 9.5 |
| (1) Dry film thickness | 250 – 300 μ m | | |
| (2) Dry film thickness | 35 – 40 μ m | | |
| (3) Dry film thickness | 60 – 70 μ m | | |

The test bodies were coated iron sheets 110 × 70 × 1 mm.

3. Ketone Test

In order to ascertain the stability of the films towards organic solvents, the "ketone-test" was made. In this the hardened film is immersed for 20 minutes in methyl isobutyl ketone. The softening is tested by the pendulum hardness test.

TABLE 13

| Epoxide resin-hardener system | Pendulum hardness according to Koenig (DIN 53,157) | |
|---|---|---|
| | Before ketone test (4) | After ketone test |
| (a) Solvent-free system (1) | 226 | 215 |
| (b) Solvent-containing system (2) | 212 | 205 |
| (c) Solvent-containing system with adduct hardener (3) | 198 | 167 |

(1) Dry film thickness 250 μ m
(2) Dry film thickness 40 μ m
(3) Dry film thickness 60 μ m
(4) after 30 days hardening time

EXAMPLE 8

451.5 g of Acid mixture B (3.5 equivalents) and 1,442.0 g of diethylene triamine (14.0 mols) are condensed together in the same way as described in Example 1. 108.0 g of condensation water, neutral material and amine pass over. The excess amine is finally distilled off at 0.2 mm Hg vacuum and up to 140°C flask contents temperature. The quantity of amine distilled off is 1,268.5 g. 517.0 g of a brown viscous product remains as a residue. It has an amine number of 328 mg KOH/g product and a viscosity at 25°C of 1,657 P.

For the manufacture of an in-situ adduct solution, 44 parts by weight of the product produced according to this Example 8, 32 parts by weight of n-butanol and 8 parts by weight of xylene are treated, while stirring, with 16 parts by weight of a solid epoxide resin having an epoxide equivalent of 500. The reaction mixture is then stirred for 1 hour at 80°C. A 60 percent in-situ adduct solution having an H-equivalent of 260 and a viscosity of 3,100 cP at 25°C is obtained. Twenty-six parts by weight of the preceding adduct solution are added, for hardening, to 100 parts by weight of a solvent-containing epoxide resin lacquer which contains 50 percent by weight of epoxide resin (epoxide equivalent — 500). After application and hardening, coatings with glossy and fault-free film surfaces are obtained. These coatings have the following properties:

1. Progress of Hardening

The increase of surface hardness was determined according to DIN 53,157. Pendulum hardness was determined at 20°C according to Koenig.

TABLE 14

| Hardening time in days | 1 | 2 | 3 | 7 | 14 |
|---|---|---|---|---|---|
| Pendulum hardness According to Koenig | 42 | 100 | 100 | 147 | 177 |

Test bodies were coated glass plates.
The dry film thicknesses were 80 – 90 μ m.

2. Erichsen Indentation.

The elasticity, extension and adhesion of the films were tested by the Erichsen method (DIN 53,156). The test bodies are coated iron sheets 110 × 70 × 1mm. The dry film thicknesses were 50–60 μ m.

| Hardening time in days | 7 | 14 |
|---|---|---|
| Erichsen indentation | 10.8 | 10.5 |

EXAMPLE 9

1,995 g of Acid mixture A (15 equivalents) and 2190 g of triethylenetetramine (15 mols) were condensed together. The condensation was carried out in exactly the same way as described in Example 1. 510 g of condensation water and neutral material pass over during the condensation. 3,675 g of a brown oily product remains as a residue. It has an amine number of 654 mg. KOH/g product and a viscosity at 25°C of 680 cP.

40 g of this product are mixed with 100 g of a liquid bisphenol A epoxide resin (epoxide value 0.52 equivalents/100 g resin, viscosity at 25°C, 11,000 cP). The mixture is hardened for 12 hours at 20°C and 4 hours at 120°C. The impact strength (DIN 53,453) of the hardened test body (120mm × 10mm × 15mm) is 15 Kp. cm/cm$^2$, and the hot rigidity according to Martens (DIN 53,458) 65°C.

EXAMPLE 10

55.5 parts by weight of a liquid epoxide resin based on bisphenol A (epoxide equivalent: 190) (Grillonit g. 3, Emser-Werke, Switzerland) are slowly added, while stirring, to 100 parts by weight of the hardener produced according to Example 9. The reaction mixture is further stirred for 1 hour at 100°C. The viscous adduct thus obtained is light yellow. Its H-equivalent is 106.

Use of this adduct hardener for 2-component epoxide resin lacquer and 2-component epoxide resin-tar lacquer 10A 100 parts by weight of the liquid epoxide resin described in Example 10 based on bisphenol A (epoxide equivalent: 190) viscosity at 25° C: 11,000 cP are mixed with 56 parts by weight of the adduct hardener described in Example 10, and 29 parts by weight of benzyl alcohol. The solvent-free lacquer thereby obtained yields after hardening, clear, fault-free film surfaces which are non-sticky.

10B 100 parts by weight of EPIKOTE 162 (trademark of Shell Chemical Corp), an aliphatic epoxide resin based on pentaerythritolpolyglycidyl ether having an epoxide number of 0.62 epoxide equivalents per 100 g of resin, are mixed with 66 parts by weight of the adduct hardener described in Example 10, and 34 parts by weight of benzyl alcohol. The solvent-free lacquer thereby obtained yields after hardening, clear, fault-free film surfaces which are free from stickiness.

10C. 50 parts by weight of the liquid epoxide resin described in Example 10 based on bisphenol A, (epoxide equivalent: 190, viscosity at 25°C: 11,00 cP) and 50 parts by weight of glycerol polyglycidyl ether (epoxide number 0.86–0.72 epoxide equivalents per 100 g of resin) are mixed with 66 parts by weight of the adduct hardener described in Example 10, and 34 parts by weight of benzyl alcohol. The solvent-free lacquer thereby obtained yields after hardening, fault-free film surfaces which are free from stickiness.

10D. 100 parts by weight of the liquid epoxide resin described in Example 10 based on bisphenol A (epoxide equivalent: 190) are mixed with 56 parts by weight of the adduct hardener described in Example 10, and 100 parts by weight of tar (Pitch No. 4 produced by the Union Carbide Corp., viscosity at 15.5°C: 270 P). The solvent-free epoxy-tar lacquer thereby obtained yields after hardening, glossy, fault-free film surfaces which are free from stickiness.

10E. 100 parts by weight of the liquid epoxide resin described in Example 10 based on bisphenol A (epoxide equivalent: 190) are mixed with 56 parts by weight of the adduct hardener described in Example 10, 29 parts by weight of benzyl alcohol, and 100 parts by weight of tar (Pitch No. 4, produced by Union Carbide Corp., viscosity at 15.5°C: 270 P). The solvent-free epoxy-tar lacquer thereby obtained yields after hardening, non-sticky, glossy and fault-free film surfaces.

weight of the adduct hardener described in Example 11, and 30 parts by weight of benzyl alcohol The solvent-free lacquer thereby obtained yields, after hardening, non-sticky, clear and fault-free film surfaces.

Properties of the Films Obtained

The properties of the films obtained after 21 days' hardening are given in the following table 16:

TABLE 16

| | Properties or test methods | Epoxide resin — hardener adduct | |
|---|---|---|---|
| | | 11A | 11B |
| 1. | Surface hardness according to DIN 53.157, pendulum hardness according to Koenig at 20°C, test bodies are coated glass plates, dry film thickness 300 - 500 μ m | 195 | 180 |
| 2. | Erichsen indentation (DIN 53,156) Test bodies are coated iron sheets 110 × 70 × 1 mm, dry film thickness 300 - 500 μ m | 6.0 | 6.5 |
| 3. | Lattice section (DIN 53,151) Cut spacing 1 mm. | 1 | 1 |

Properties of the Films Obtained

The properties of the films obtained after 21 days' hardening are given in the following table 15:

TABLE 15

| | Properties or test methods. | Epoxide resin-hardener adduct system. | | | | |
|---|---|---|---|---|---|---|
| | | 10A | 10B | 10C | 10D | 10E |
| 1. | Surface hardness according to DIN. 53,157, pendulum hardness at 20°C, test bodies are coated glass plates, dry film thickness 300 - 500 μ m | 110 | 23 | 45 | 65 | 40 |
| 2. | Erichsen indentation (DIN 53,156) test bodies are coated iron sheets 110 × 70 × 1 mm, dry film thickness 300 - 500 μ m | 7.7 | 7.10 | 10 | 7.10 | 7.10 |
| 3. | Lattice sections (DIN 53,151) Cut spacing 1 mm. | 1 | 1 | 1 | 1 | 1 |

EXAMPLE 11

56.5 parts by weight of Cresyl glycidyl ether (epoxide equivalent 174–185) are slowly added, while stirring, to 100 parts by weight of the hardener produced in accordance with Example 9. The reaction mixture is further stirred for 1 hour at 100°C. The viscous adduct hardener so obtained is light yellow. Its H-equivalent is 145.

Use of this adduct hardener for solvent-free 2-component epoxide resin lacquer.

11A. 100 parts by weight of a liquid epoxide resin based on bisphenol A (GRILONIT g.3 Emser-Werke AG Switzerland) (epoxide equivalent 190) are mixed with 76.5 parts by weight of the adduct hardener described in Example 11. The solvent-free lacquer thereby obtained yields, after hardening, non-sticky, clear and fault-free film surfaces.

11B. 100 parts by weight of the liquid epoxide resin named in Example 11A, based on bisphenol A (epoxide equivalent: 190) are mixed with 76.5 parts by

What is claimed is:

1. A process for the manufacture of condensation products suitable as hardeners for epoxide resins, which comprises condensing a. byproducts obtained in the oxidation of a cycloalkane with oxygen or an oxygen-containing gas, said byproducts comprising hydrocarbons containing carboxylic acid groups, and being capable of reacting with primary and secondary amines and which can form water soluble alkali metal salts, with b. amines having the structure

in which n is 2–6, and A is a lower alkyl radical having two or more carbon atoms, each A radical being linked by different carbon atoms to adjacent members, the A radicals being the same or different, or with c. neopentyltetramine;

the amine being present in a ratio such that at least two amino groups of the amine correspond to one equivalent of the titratratable acid group of the byproducts.

2. The process of claim 1 in which the amines are diethylenetriamine, triethylenetetramine and bis-(3 amino propyl)-imine.

3. The process as claimed in claim 1, wherein the cycloalkane is cyclohexane and methyl cyclohexane.

4. The process as claimed in claim 1 wherein the cycloalkane is cyclodecane.

5. The process as claimed in claim 1 wherein $n$ is 2 to 4.

6. The process as claimed in claim 1, wherein the condensation is carried out at a temperature of about 150° to 300°C.

7. The process as claimed in claim 1, wherein at least two amino groups of the polyvalent aliphatic amine are present per equivalent of titratable acid groups in the byproducts.

8. The process as claimed in claim 7, wherein 2 to 8 mols of the polyvalent aliphatic amine are present per acid equivalent.

* * * * *